Sept. 22, 1953 W. BORNEMANN 2,652,759
APPARATUS AND PROCESS FOR TREATING LIGHT-SENSITIVE
MATERIALS WITH LIQUID
Filed Nov. 25, 1949 10 Sheets-Sheet 1

WILLIAM BORNEMANN
INVENTOR

BY Donald C. Brown
ATTORNEY

WILLIAM BORNEMANN
INVENTOR

BY Donald L. Brown
ATTORNEY

Sept. 22, 1953  W. BORNEMANN  2,652,759
APPARATUS AND PROCESS FOR TREATING LIGHT-SENSITIVE
MATERIALS WITH LIQUID
Filed Nov. 25, 1949  10 Sheets-Sheet 4

WILLIAM BORNEMANN
INVENTOR

BY Donald L. Brown
ATTORNEY

Sept. 22, 1953          W. BORNEMANN                    2,652,759
         APPARATUS AND PROCESS FOR TREATING LIGHT-SENSITIVE
                         MATERIALS WITH LIQUID
Filed Nov. 25, 1949                                10 Sheets-Sheet 5

WILLIAM BORNEMANN
        INVENTOR

BY Donald L. Brown
        ATTORNEY

Sept. 22, 1953 W. BORNEMANN 2,652,759
APPARATUS AND PROCESS FOR TREATING LIGHT-SENSITIVE
MATERIALS WITH LIQUID
Filed Nov. 25, 1949 10 Sheets-Sheet 6

WILLIAM BORNEMANN
INVENTOR

BY Donald L. Brown
ATTORNEY

Sept. 22, 1953 W. BORNEMANN 2,652,759
APPARATUS AND PROCESS FOR TREATING LIGHT-SENSITIVE
MATERIALS WITH LIQUID
Filed Nov. 25, 1949 10 Sheets-Sheet 7

WILLIAM BORNEMANN
INVENTOR

BY Donald L. Brown
ATTORNEY

Sept. 22, 1953 W. BORNEMANN 2,652,759
APPARATUS AND PROCESS FOR TREATING LIGHT-SENSITIVE
MATERIALS WITH LIQUID
Filed Nov. 25, 1949 10 Sheets-Sheet 10

INVENTOR
William Bornemann
BY
Donald R. Brown
Attorney

Patented Sept. 22, 1953

2,652,759

UNITED STATES PATENT OFFICE 2,652,759

APPARATUS AND PROCESS FOR TREATING LIGHT-SENSITIVE MATERIALS WITH LIQUID

William Bornemann, Rochester, N. Y., assignor, by mesne assignments, to Polaroid Corporation, Cambridge, Mass., a corporation of Delaware Application November 25, 1949, Serial No. 129,458

14 Claims. (Cl. 95—94)

This invention relates to photography, and more particularly to processes and apparatus for subjecting a light-sensitive sheet material to a predetermined treatment by spreading thereover a layer of suitable processing fluid.

The present application is a continuation-in-part of my copending application Serial No. 93,972, filed May 18, 1949, entitled "Photographic One-Step Process Print-Making Machine," now Patent No. 2,552,251, issued May 8, 1951.

It has heretofore been proposed to process a light-sensitive sheet material by spreading on the surface thereof the liquid content of a rupturable, disposable container, the liquid of the container being preferably spread between the light-sensitive sheet material and another sheet material. The second sheet material functions to isolate the layer of liquid from the spreading mechanism and assists in insuring a uniform layerwise distribution of the liquid over the surface of the light-sensitive sheet material and, in addition, may carry one or more of the processing reagents in a condition to be dissolved in the layer of processing liquid. It may also serve as a support for a transfer print obtained by any one of the one-step transfer processes disclosed in the Journal of the Optical Society of America, volume 37, No. 2, of February 13, 1947, in the article by Edwin H. Land entitled "A New One-Step Photographic Process." A series of patents have issued showing photographic apparatus for processing light-sensitive elements in the foregoing manner and these include the following patents:

| Name | U. S. Patent No. | Issued |
| --- | --- | --- |
| Land | 2,435,717 | February 10, 1948. |
| Land | 2,435,718 | February 10, 1948. |
| Land | 2,435,720 | February 10, 1948. |
| Wolff | 2,443,154 | June 8, 1948. |
| Garrett | 2,451,820 | October 19, 1948. |
| Carbone et al | 2,455,111 | November 30, 1948. |
| Land | 2,455,125 | November 30, 1948. |
| Messina et al | 2,458,186 | January 4, 1949. |

It is one object of the present invention to provide a novel apparatus and process wherein a plurality of exposed areas of a light-sensitive sheet material are successively subjected to a predetermined processing by spreading over each said area the contents of at least one of a plurality of interconnected containers.

Another object of the invention is to provide a novel process and apparatus wherein an elongated strip, comprising a plurality of liquid-carrying containers, is advanced across the path of movement of a light-sensitive sheet material so that at least one of said containers is located adjacent an area of said light-sensitive sheet material to be processed and wherein the contents of said container are released and spread in a layer between said area of said light-sensitive sheet material and another sheet material.

A further object is the provision of an improved apparatus comprising a supporting plate and a member movable relative to said supporting plate for spreading a liquid in a layer between a photosensitive sheet material and another sheet material supported on said plate, said apparatus comprising means suitably mounted on said plate for controlling the distribution and thickness of the liquid layer.

In this application, where "negative" or light-sensitive material is used the term is to include any suitable base, such as paper or pyroxylin, which may be coated with a light-sensitive coating such as a silver halide emulsion capable of receiving a developable image after exposure. The exposed and developed image may be referred to as a "negative," although this use of negative differs from the ordinary negative in that it need not be a silver image on a pyroxylin film base which is a reverse of the desired final positive. As used in this specification, it merely means a developed image on any base which may be used to form the image which is, at least in part, transferred to a receiving medium. Certain known types of bromide papers are suitable for the "negative" of this process.

Where "receiving sheet," or paper, is referred to in this application, it is to be understood to cover any suitable coated or uncoated base material, preferably paper, which is adapted to receive an image by being brought into contact under pressure with the negative material in the presence of a suitable image-forming processing agent, such as described in the one-step photographic process article by E. H. Land, above-referred to.

Coming now to the drawings wherein like references denote like parts throughout.

It may be noted that in the various views which have been above described, many of the parts which are unessential have been omitted and many of the views are at least partially schematic to better illustrate the invention.

This printing machine may be broadly described as a machine in which a sheet of photographically light-sensitive coated material, such as certain types of bromide paper, may be moved beneath an exposing station, and may be again moved onto a support so that a pod containing a processing agent may be moved across and beyond one end of the exposed area. A movable carriage then rolls an area of a receiving sheet, preferably of paper, over the pod and over the exposed sensitive coated sheet bearing the latent image. The pod is a processing agent enclosed in an easily rupturable package, or envelope, as described by E. H. Land. A roller movable with the slidable carriage ruptures the pod and smooths the receiving sheet upon the exposed material with the processing agent therebetween. After so ironing the sheets together, a time interval is permitted to elapse with the sheets in contact, after which a reverse movement of the carriage winds up the receiving sheet with the image thereon. Measuring rolls are then operated to unwind the resulting print; first, a short distance to unwind the waste material, at which time a chopper cuts off the waste. The measuring rolls then unwind a greater length of material containing the print and the chopper again cuts off the print, depositing it into a suitable container. While the amount of winding is arranged to care for the particular size of print and waste material between the prints, the relative distances may vary. However, as an example, the waste material may be one turn of the feed rolls and the print area may be three turns of the rolls. The exposed and developed sensitized material, after being used for producing the prints, may be wound on a wind-up which operates in synchronism with the feed rolls.

Figures 1, 2:
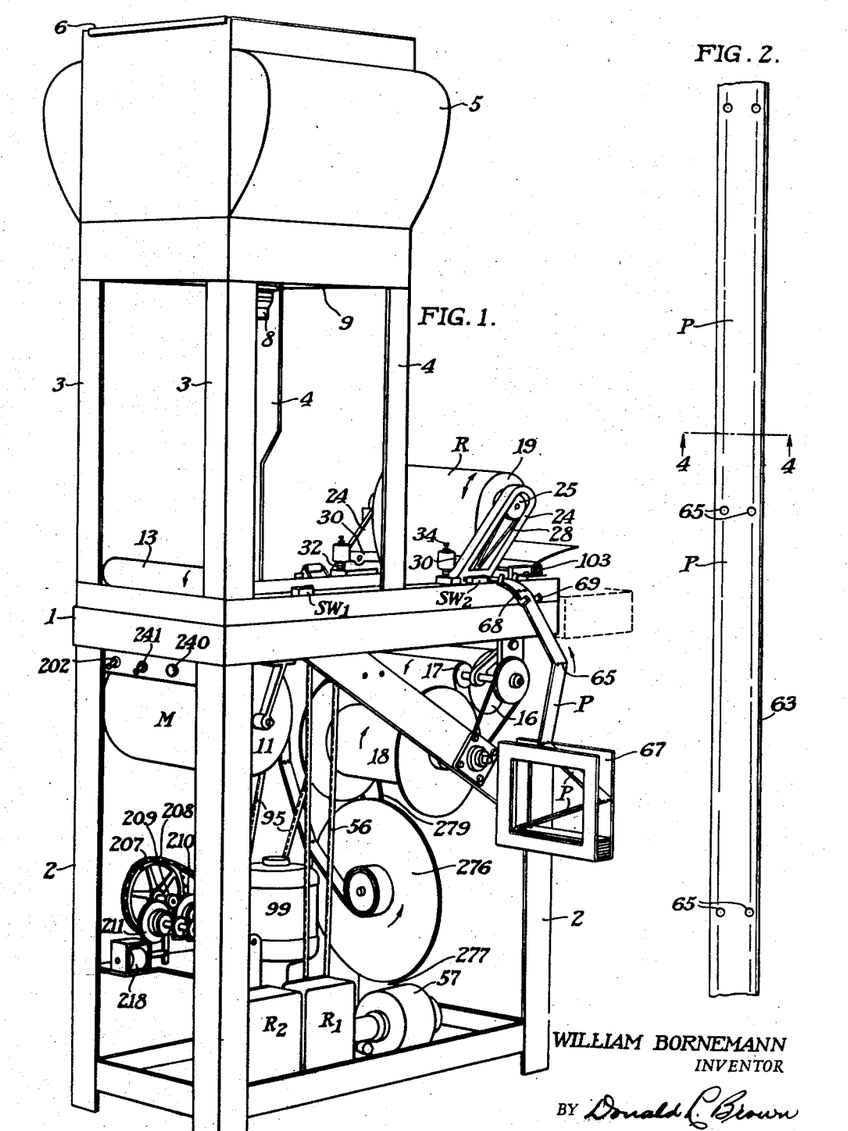
Figure 1 is a perspective view of a typical machine constructed in accordance with and embodying a preferred form of my invention.
Fig. 2 is a top plan view showing an area of a developing "pod" which may be used in connection with the machine shown in Fig. 1.

More specifically, as a preferred embodiment of my machine, the machine may consist, as shown in Fig. 1, of a table-like structure 1 supported on legs 2. Extensions 3 of two of these legs may be extended upwardly to form, with a second pair of legs 4, a support for a lamphouse 5. This lamphouse may have a platen 6 for supporting material to be copied, and lamps 7 diagrammatically illustrated in Fig. 21 may be employed to illuminate the material to be copied. An objective 8 is supported on a bottom wall 9 of the lamphouse and a shutter 10, best shown in Fig. 19, may be employed in a suitable position, such as just above or below the objective 8, to control an exposure.

Figure 21:
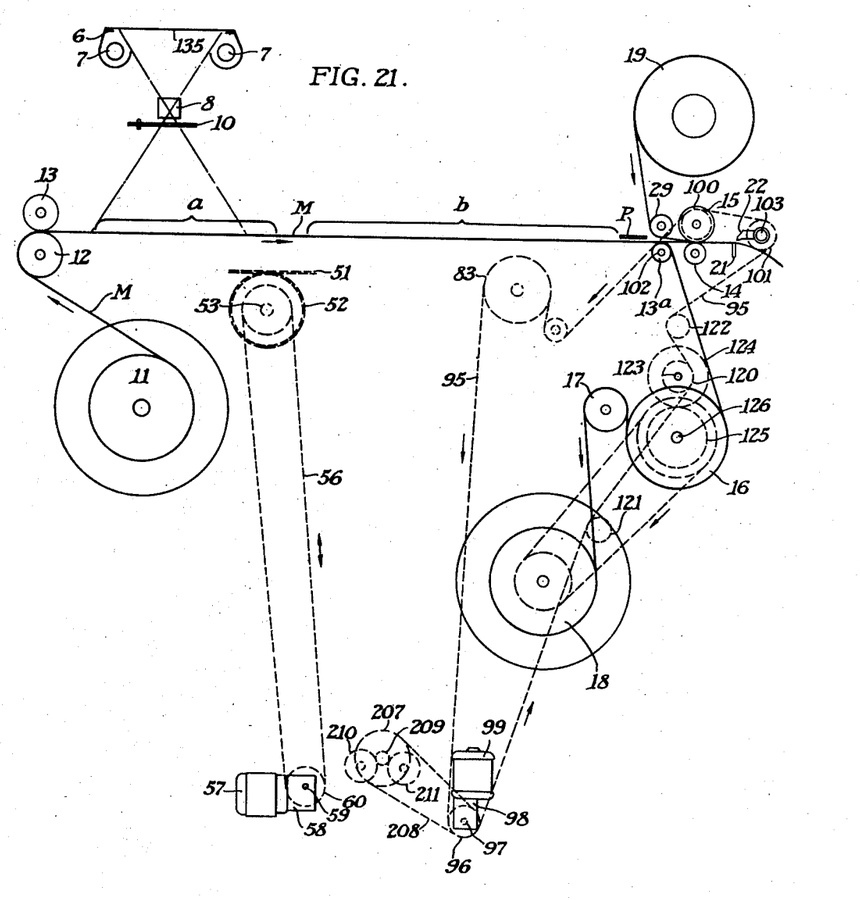
Fig. 21 is a schematic elevation showing diagrammatically the general arrangement of the various parts.

Referring to the diagrammatic showing of the machine in Fig. 21, I prefer to provide a roll 11 of the light-sensitive coated material beneath the table top 1 so that the sensitized material M may be drawn over a guide roll 12 beneath a roll 13. This material may be then led across the top of the machine over an idler 13a, thence downwardly around the pull-down roll 16, over an idler 17 to the wind-up roll 18. The receiving sheet may consist of a supply roll 19 from which the sheet passes below a pressure roll 20, and thence between the feed roll 15 and idler 14 and thence over a fixed blade 21 against which a movable knife blade 22 may cut off the lengths of the receiving sheet required to dispose of waste material and to chop off the prints as they are made.

Figures 3, 4, 5:
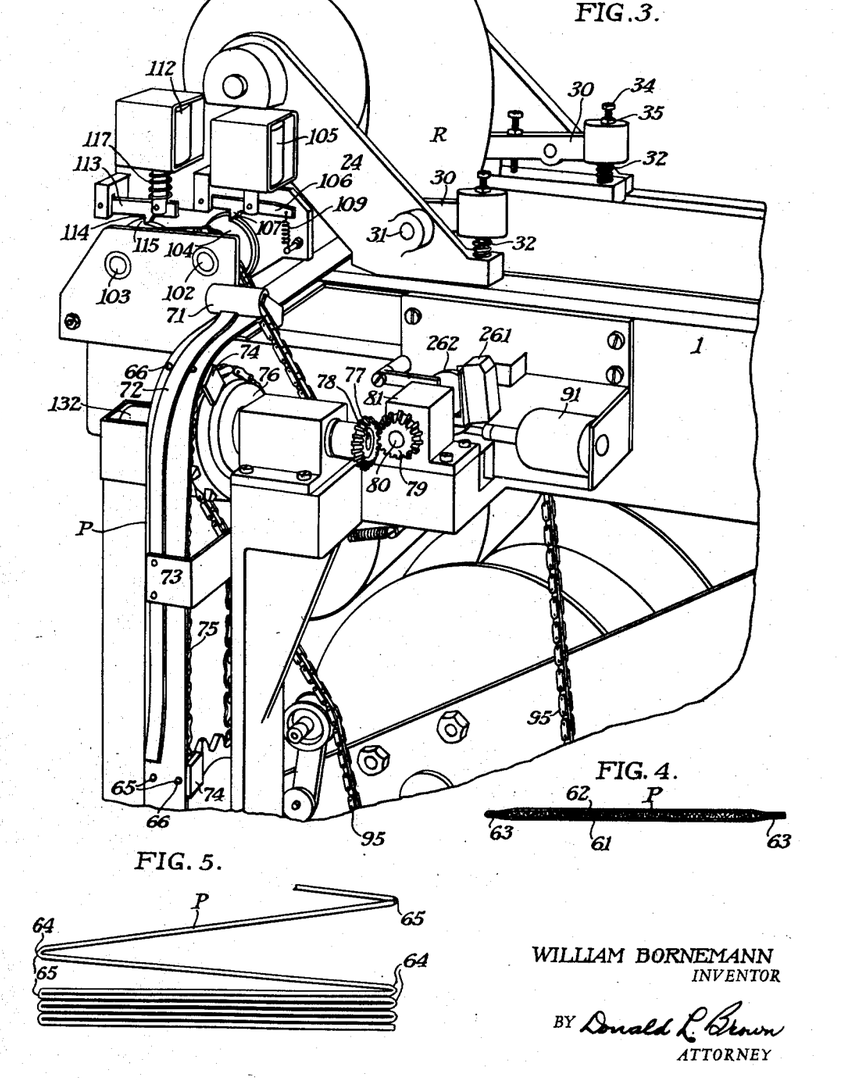
Fig. 3 is an enlarged fragmentary perspective detail showing a portion of the machine shown in Fig. 1, and including certain details of the receiving sheet carriage, the pod-moving mechanism, and a wind-up for the used coated material.
Fig. 4 is a section through a pod taken on line 4—4 of Fig. 2.
Fig. 5 is a fragmentary detail illustrating a preferred arrangement of pod material folded into usable lengths for successive prints.
Figure 6:
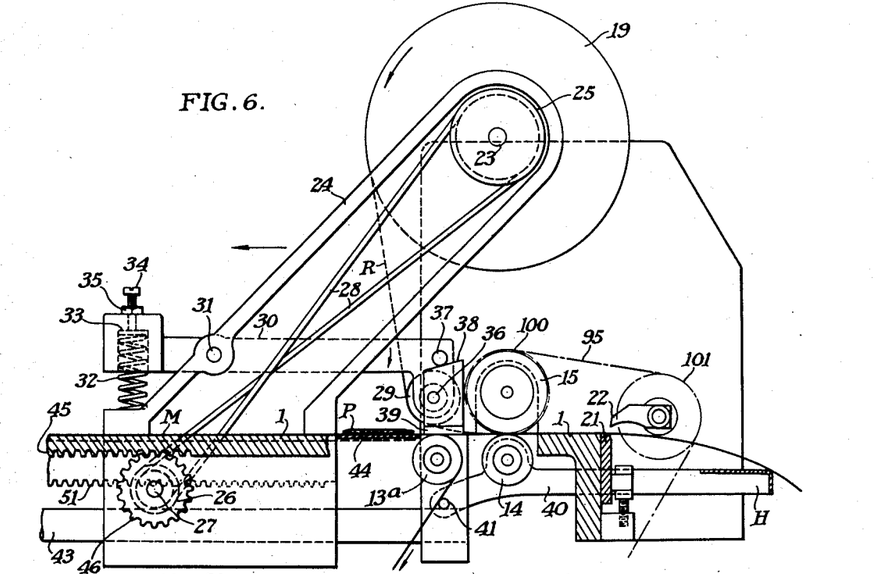
Fig. 6 is an enlarged fragmentary sectional detail showing a portion of the movable carriage, the receiving sheet-winding mechanism, the chopper, and the feed rolls, as well as a portion of the loading structure.

The receiving sheet roll 19, best shown with its supporting carriage in Figs. 3 and 6, comprises a shaft 23 which is mounted to turn on suitable supporting arms or brackets 24. A pulley 25 on the shaft 23 is connected to a pulley 26 on a shaft 27 by means of a belt 28 which is preferably crossed. The receiving sheet material R is led downwardly and under the pressure roller 29 which is supported by arms 30 on the carriage pivoted at 31 and being pressed in the direction shown by the arrow in Fig. 6 by a spring 32. This pressure may be adjusted by a spring presser member 33, a screw 34 and a set nut 35. The supporting arms 30 carry the pressure roller 29 by means of a shaft 36 extending between the arms, and also carry pins 37 which engage a cam surface 38. The cam surface is carried by brackets 39 supported by the table top. When the carriage is in its Fig. 6 position, the pressure roller 29 is raised. In this position the receiving sheet R may be threaded beneath the roller 29 and between the feed rolls 15 and 14 when the lower roll 14 is moved downwardly by moving the handle H in the direction shown by the arrow in Fig. 6. This turns the supporting arms 40 about their pivots 41, thereby separating the feed roller 14 by lowering it relative to roll 15 so that the receiving sheet R can be threaded through the path shown. In initially threading the sheet of sensitized material M, it is merely passed from the supply roll 11 between rolls 12 and 13 across the table top 1 and over roll 13a, after which it is passed down around pull-down roll 16, over idler 17, and is attached to the take-up roll 18.

Figure 7:
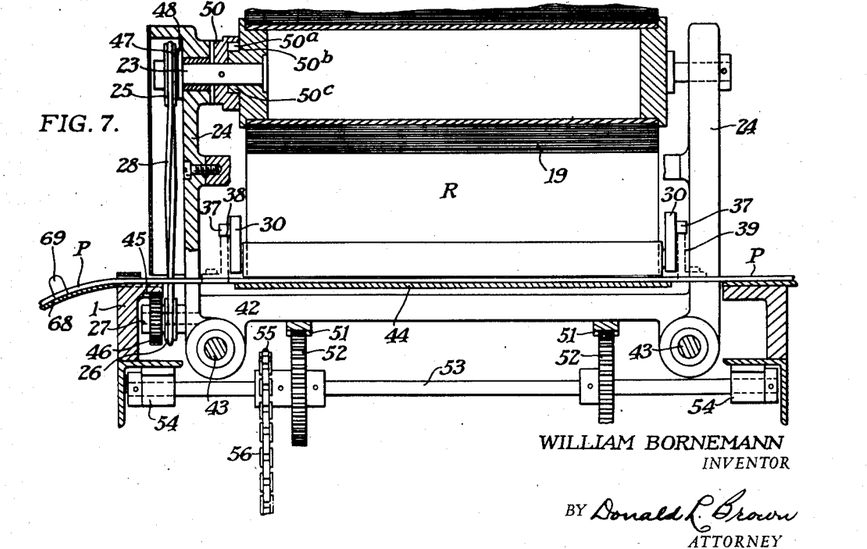
Fig. 7 is a transverse section through the slidable carriage shown in Fig. 6.

The supporting arms 24, Fig. 7, are attached to a carriage 42 which is mounted to slide on parallel ways 43 carried by the table 1. Thus, the carriage can be accurately guided in parallel relationship to a support 44 for the sensitized coated material M to iron or smooth the receiving sheet R thereon by means of the pressure roller 29.

The table top 1, Fig. 7, includes a rack 45 with which a gear 46 meshes, this gear being connected to the pulley 26. The shaft 27 supporting the gear 46 is carried by the carriage 42 and therefore moves when the carriage slides along the parallel rails 43.

As indicated in Fig. 7, the upper pulley 25 is connected to the shaft 23 through a known type of slip clutch having a clutch face 47 adjacent the pulley and a second slip clutch face 48 carried by the shaft 23. Thus, slippage can occur when a predetermined load is applied. If desired, this slippage can readily be accomplished between the belt 28 and the pulley 25, but the face plates are preferred.

Figures 10, 11, 12:
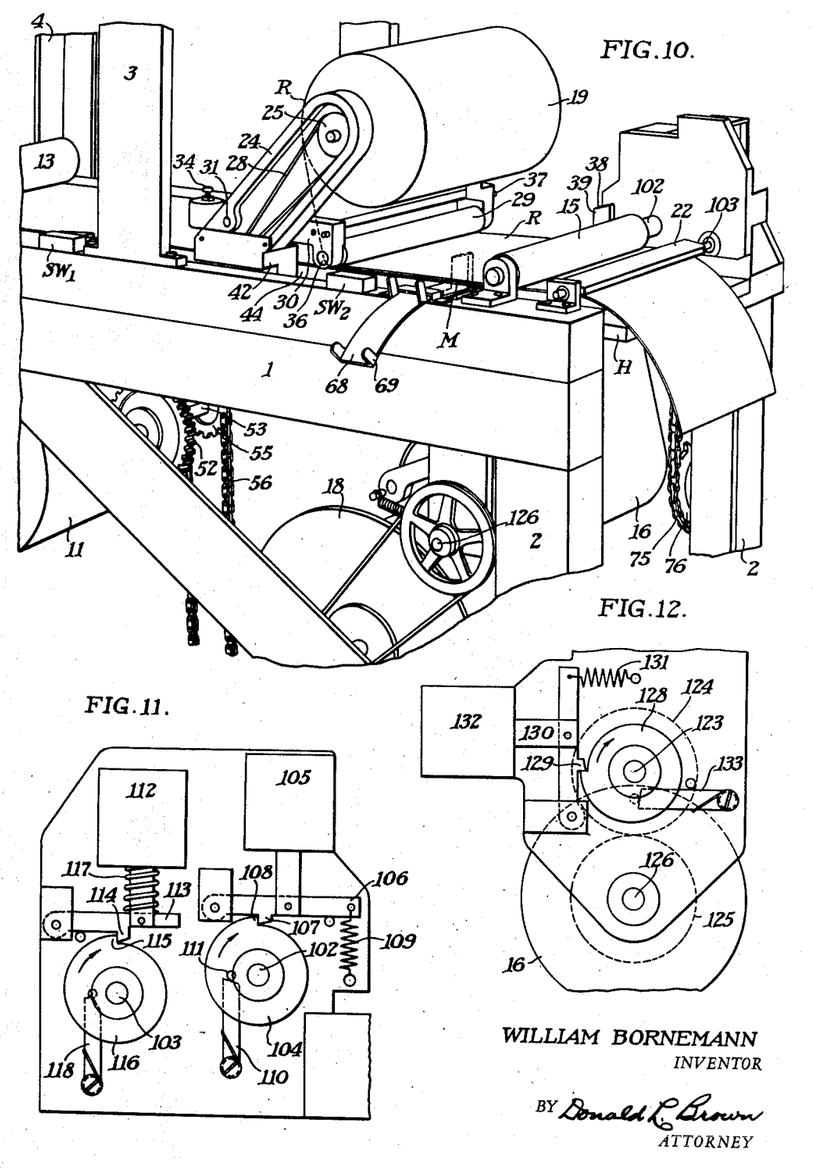
Fig. 10 is a fragmentary perspective view showing the receiving sheet rolled against the photographically sensitive coated material, the pod being omitted to better show this construction.
Fig. 11 shows the one-revolution trip mechanisms used to operate the feed rolls and the knife.
Fig. 12 is a view of the one-revolution trip mechanism used to operate the wind-up mechanism.

When the carriage is moved in the direction shown by the horizontal arrow in Fig. 6, the pin 37 slides down the cam 38 so that the spring 32 forces the pressure roller 29 with known pressure, first upon the pod P which lies on the sensitized coated sheet M and then the roller continues to press the receiving sheet R on the contents of the pod and the sensitized material M as the carriage moves from its Fig. 6 position to its Fig. 10 position in which the two sheets are held in intimate contact. A guide roller 13a may be fixedly mounted on the table top 1 beneath the rest position of the pressure roll 29, if desired.

When the carriage is moved, gear 46, pulleys 25 and 26, and belt 28 will permit the receiving sheet R to be unwound as the carriage moves in one direction and, when moved in a reverse direction, it will wind up the roll 19 in the direction opposite to that shown by the arrow in Fig. 6 to strip off that part of the sheet which has been processed and which bears the copy print. This is accomplished by the one-way clutch face 50 which is pinned to shaft 23 so that a roller 50a lying in a tapered slot 50b may drive hub 50c when rotated in one direction and release when driven in an opposite direction. The one-way clutch may be of this or any other known construction.

The carriage is driven by the mechanism shown in Fig. 7. The bottom of the carriage 42 is provided with a pair of spaced racks 51 meshing with gears 52 carried by a shaft 53 journaled at 54 on the table top 1. The shaft 53 carries a sprocket 55 which may be driven by a chain 56 diagrammatically shown in Fig. 21, through a motor 57 having a suitable gear reduction 58 and a main driving shaft 59 driving a sprocket 60 operating the shaft the desired amount to move the carriage first in one direction and then in the other direction through a cycle. The control for this cycle will be described later.

Figures 8, 9:
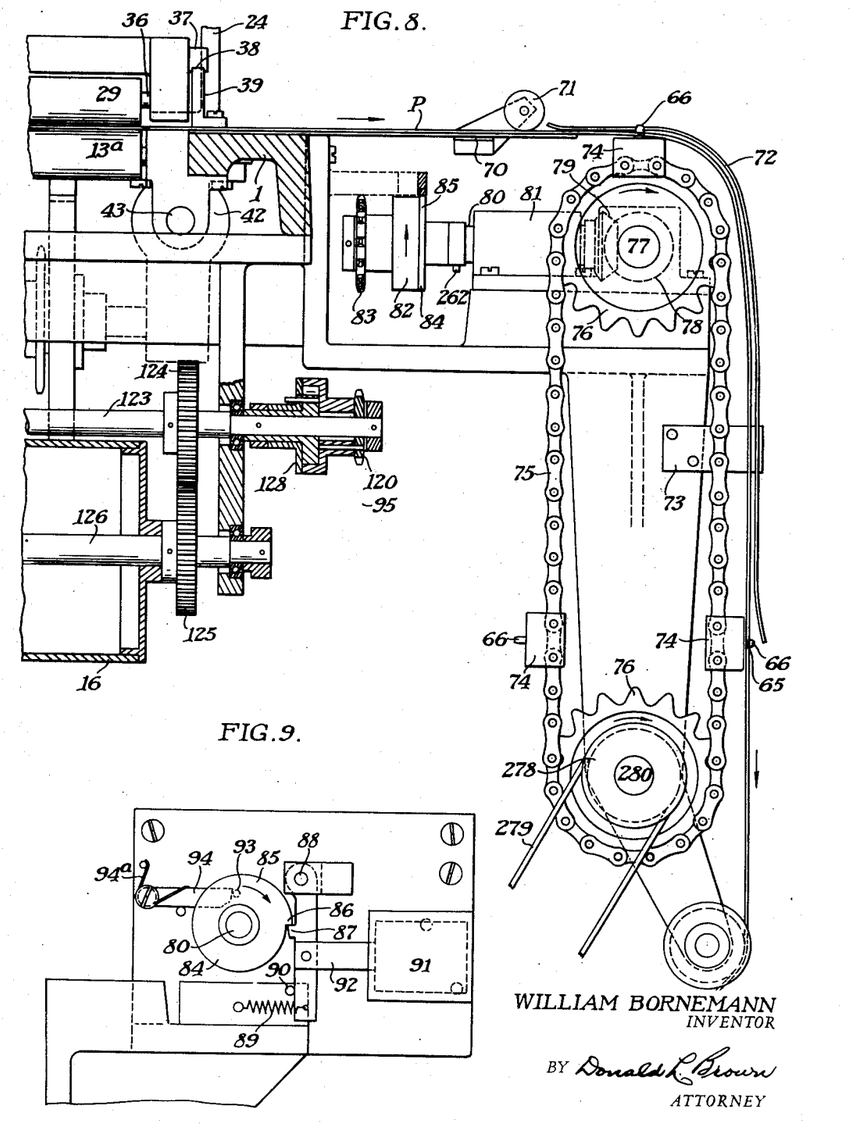
Fig. 8 is a fragmentary part section, partly in elevation, of the pod-feeding mechanism, and showing a portion of a carriage drive mechanism.
Fig. 9 is a detailed side elevation of a trip for a one-revolution shaft which is used to drive the pod-operating mechanism.

Before the rolling movement commences, it is necessary to properly position a pod P across the end of an exposed area on the sensitized material M and preferably close to and parallel with the pressure roller 29. Pods are supplied preferably in the form shown in Fig. 5 in a suitable container with the pods folded back and forth, as shown in this figure. As indicated in Fig. 4, the pods may be formed of two sheets 61 and 62 of readily rupturable material joined at their lateral edges 63 and also at their end 64 (Fig. 5) so as to provide rectangular frangible containers which are provided with pairs of spaced indexing apertures 65. One or more pairs of these apertures may be provided for each individual pod so that driving pins 66, carried by a chain 75, shown in Fig. 8, may engage spaced apertures to positively move the pods for each exposure to present a fresh pod of processing agent for each exposure. On one side of the machine, as shown in Fig. 1, there is a suitable container 67 for the pod material. From this container the endless strip of pods is led up over a guideway 68 with pairs of guiding arms 69 across the table top 1, as shown in Figs. 3 and 6, and thence outwardly as indicated in Fig. 8 above a guide bracket 70 beneath a guide roller 71 and beneath a curved guiding plate 72 which is to hold the pod material upon the moving pins 66 as indicated in Fig. 8. The guiding plate 72 may be supported as by suitable brackets 73 so that the guiding plate will closely follow the path of the pins 66 which are carried by chain blocks 74 supported by a chain 75 passing over spaced sprockets 76. A pulley 278 mounted on the shaft 280 of the lower sprocket 76 carries a belt which drives a drum 276 (Fig. 1) pivoted on a support 277. The used and discarded pods, still connected, are wound on this drum, which may have a slip clutch plate, not shown, to compensate for the increasing diameter of the wound material.

The upper sprocket 76 is carried by a shaft 77 on which there is a beveled gear 78 meshing with a beveled gear 79 carried by the shaft 80 passing through a journal block 81. This shaft is driven by the sprocket 83 through a one-revolution clutch and slip clutch 82, shown in Fig. 9. The one-revolution clutch and slip clutch may consist of the usual slip clutch pair of face plates 84 which will slip if a predetermined load is exceeded and the face plate 84 may include a cam periphery 85 (Fig. 9) having a stop lug 86 lying in the path of a latch 87. This latch is pivotally mounted at 88 and drawn by a spring 89 against a stop pin 90 and against the cam 85. A solenoid 91 when actuated may draw in the core 92 and release the latch momentarily so that the shaft 80 may then be turned through the sprocket 83 until the lug 86 again strikes the latch 87 at which time the slip clutch will function. A pin 93 may be carried by the face plate 84 and a second latch member 94 pressed by a spring 94a into an operative position may allow the pin 93 to pass by flexing the spring 94a thus eliminating movement in a reverse direction.

The sprocket 83 is one of a series of sprockets driven by a chain 95 and shown in Fig. 21. Chain 95 is an endless chain which is driven by a sprocket 96 on a shaft 97 which is driven by a suitable gear reduction 98 from a drive motor 99. This motor may tend to turn the shaft 80 at all times, but it is unable to do so because of the slip clutch until the one-way clutch is released and the latch 87 moves away from the lug 86. When this occurs, shaft 80 will turn one revolution, which is a distance just necessary to move a fresh pod into place, and then will stop.

Referring again to Fig. 6, after a print has been made and wound on the roll 19, it is desirable to move the sensitized coated material M and the receiving sheet R to get ready for another print. To do this, the measuring rolls 14 and 15 and the choppers 21 and 22 are operated in timed relation. That area of the receiving sheet R which lies against the pod P when it is ruptured by the pressed roll 29 does not, of course, contain a picture when the sensitized material and the receiving sheet have been processed and, accordingly, it is desirable to chop off this unwanted portion of the sheet. This area may be one-fourth as long as the length of the print, although this dimension is, of course, only by way of example. If it is such a dimension, the measuring roll 15 may turn a single turn to position the unwanted portion of the sheet between the cutting knives 21 and 22 which may then be operated to cut off the waste material and then the measuring roll 15 may be rotated, say three times, to unwind the picture-bearing area of the receiving sheet R from the roll 19 between the knives 21 and 22, after which they again operate to cut off the print. This is accomplished in the following manner. The endless chain 955, shown in Fig. 21, passes over a feed roller sprocket 100 and over a knife-driving sprocket 101 so that these two sprockets, which are constantly driven, may drive the feed shaft 102 and the knife shaft 103 when one-revolution slip clutch assemblies on these shafts are operated.

Referring to Fig. 11, the shafts 102 and 103 have one-revolution slip clutch assemblies of the same type as used for the pod-drive assemblies of Fig. 9. Shaft 102, which is the feed-roller shaft, may be intermittently driven when the one-revolution clutch plate 104 is released by a solenoid 105 drawing momentarily upwardly on the latch 106 to move the latch element 107 away from the clutch plate latch 108. Latch 106 is attached to a spring 109, and there is a safety latch 110 adapted to engage the pin 111 on the clutch plate to prevent rearward movement. Each time the solenoid 105 is actuated, it raises the latch 106 and allows the one-revolution slip clutch 104 to continue to revolve as long as the solenoid 105 is energized which, in this instance, will be a time sufficient for three revolutions.

In a similar manner, the shaft 103 may be allowed a single revolution when the solenoid 112 is energized to raise the latch 113 so that the latch element 114 will momentarily release the latch element 115 on the one-revolution plate 116. When the shaft 103 makes its one revolution, the movable knife blade 22 swings from the position shown in Fig. 6 in the direction shown by the arrow through 360° to cut off the receiving sheet lying across the relatively fixed knife plate 21. A spring 117 normally holds the latch downwardly and a safety latch 118 is provided. The means for timing this mechanism will be more fully described later.

The coated material M is moved entirely separately from the receiving paper, and it is not threaded through the feed rollers 14, 15 but is passed over an idler 13a beneath pressure roll 29. From idler 13a the sensitized material M passes around a pull-down roll 16, over an idler 17 and thence is wound upon a take-up roll 18. Pull-down roll 16 is operated separately.

Referring to Fig. 21, it will be noted that the chain 95 passes about a sprocket 120 after passing over an idler 121 and a second idler 122 gives the chain a sufficient wrap around the sprocket to drive sprocket 120. This sprocket drives one end of shaft 123 on which is a gear 124 meshing with a gear 125 on shaft 126. Shaft 126 may be driven one revolution at a time through the one-revolution slip clutch shown in Fig. 12. Here, the control (a one-revolution clutch) is placed on shaft 123 for convenience, this shaft having the gear 124 meshing with the gear 125 and being of the same size so that control of shaft 123 necessarily controls shaft 126. The one-revolution clutch plate 128 may be held by a latch 129 while the clutch slips until the latch 129 is pulled against the pressure of a spring 131 by means of a core 130 when the solenoid 132 is energized. This momentarily releases the latch 129 and the slip clutch may drive shaft 123 one revolution. A safety latch 133 similar to those previously described is also employed. The size of the driving gears is arranged to move the wind-up roll the proper distance to wind up one area of the sensitized material M plus the waste area at the end across which the pod laid before the sensitized material M and the receiving sheets and pod were rolled together for processing.

Figures 17, 18, 19:
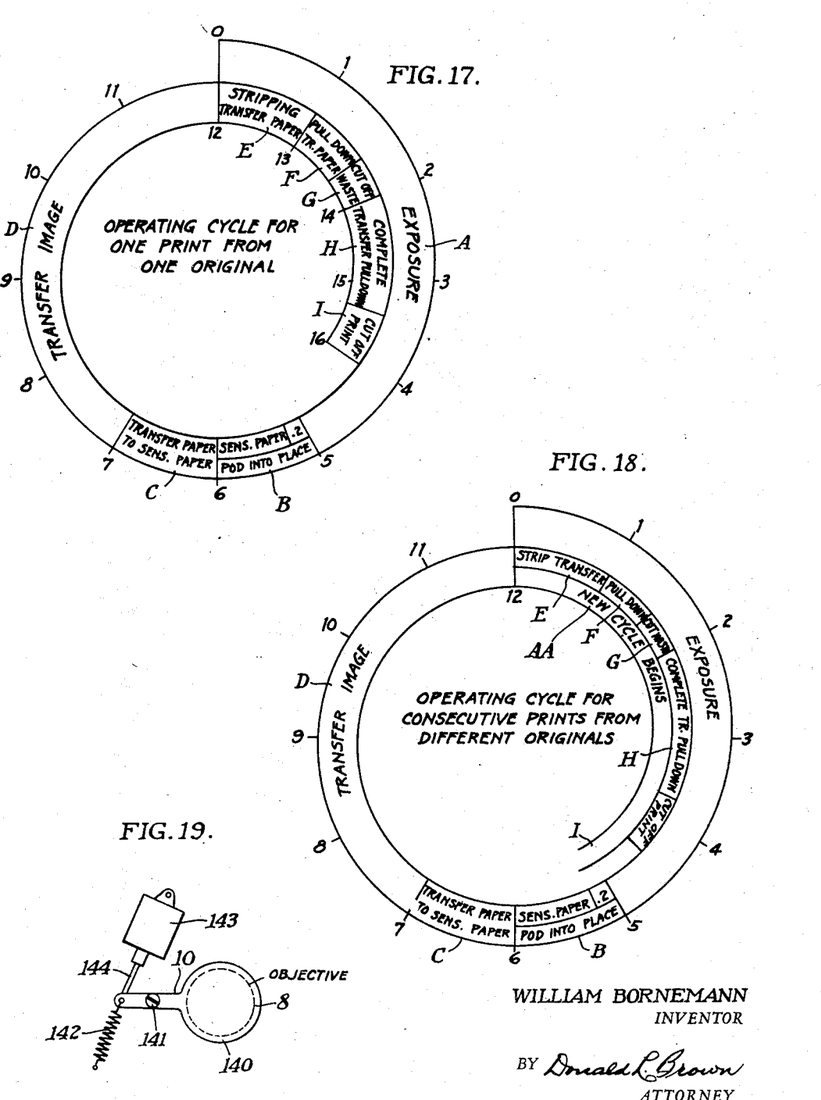
Fig. 17 is a diagrammatic chart showing a typical cycle of operations for a single print from a single original.
Fig. 18 is a similar chart showing a speeded-up cycle for making consecutive prints from different originals.
Fig. 19 is a diagrammatic view of a shutter and shutter-operating mechanism which may be used as a part of my machine.

Before a print can be made, the sensitized material M must be exposed. Referring to Fig. 21, the sensitized material may be exposed at the area $a$ in the following manner. A sheet 135 of material to be copied is held flat on a platen 6 and an image of this material may be formed by the objective 8 on the area $a$ by means of a shutter designated broadly as 10. This shutter, as shown in Fig. 19, may consist of a simple plate 140 pivoted at 141 and having an arm to which is attached a spring 142 tending to close the shutter. A solenoid 143 may move the shutter to an open position when energized through a core 144 so that the shutter 10 will remain open as long as the solenoid 143 is energized.

Figs. 17 and 18 show preferred operating cycles for a typical machine. As indicated in Fig. 17, the steps of each cycle are from A to I inclusive, and the graduations in numerals around the spiral chart are for convenience graduated into seconds. In this figure, operation A is exposure and this may take 5 seconds. Operation B moves the sensitized material and the pod into place, the pod being moved two-tenths of a second before the sensitized material starts to move, the entire operation taking one second. In operation C, transfer paper is rolled against the sensitized material in the next second. Operation D, the processing, is accomplished with the transfer paper, the processing agent, and the sensitized material lying flat and squeezed together for 5 seconds. In operation E, the transfer paper is stripped from the developed sensitized coating material in one second. In operation F, somewhat over a half second is employed to measure off a short length of transfer paper which is waste material which is then, in about a third of a second, cut off in operation G. In about a second and a third, in operation H, the print-bearing transfer section is moved toward the knife, and in operation I, in about two-thirds of a second, the chopper cuts off the completed print. This completes the cycle and for the next cycle material to be copied may be placed on the platen 136 so that the objective 8 may expose a fresh area of the light-coated sensitive material in area a diagrammatically illustrated in Fig. 21.

It is possible to speed up the operation since copy material may be placed on the platen 136 and an exposure may be made while operations E to I inclusive are being carried out, as indicated in Fig. 18. Thus, the five seconds used for exposure may take place while operations E to I are being carried out, because during these operations only the transfer paper is being affected and the sensitized material lies in position for exposure while these operations are being carried out. Thus, the cycle may be completed in 12 seconds, although this, of course, gives somewhat less time for an operator to adjust the material from which the copy is to be made.

The cycles indicated in these two charts are purely by way of example and the various timing can be changed by rearranging the cams on the control unit relative to their respective shafts to accomplish the desired end. It is, of course, possible with my improved construction, since the sensitized material will lie flat on its support and may be moved independently of cycles E to I, to make a plurality of prints from a single exposed area by cutting out operations C and D and merely moving the transfer carriage and the receiving paper thereon back and forth over the exposed area of the sensitized material, if desired. It is thought that these charts may assist in visualizing the operations of my machine and it is, of course, understood that the various times for the different steps may have to be adjusted to suit the particular sensitized material employed, the lamp brilliance, and the exposure and other variable factors which normally occur in printing operations.

Figure 20:
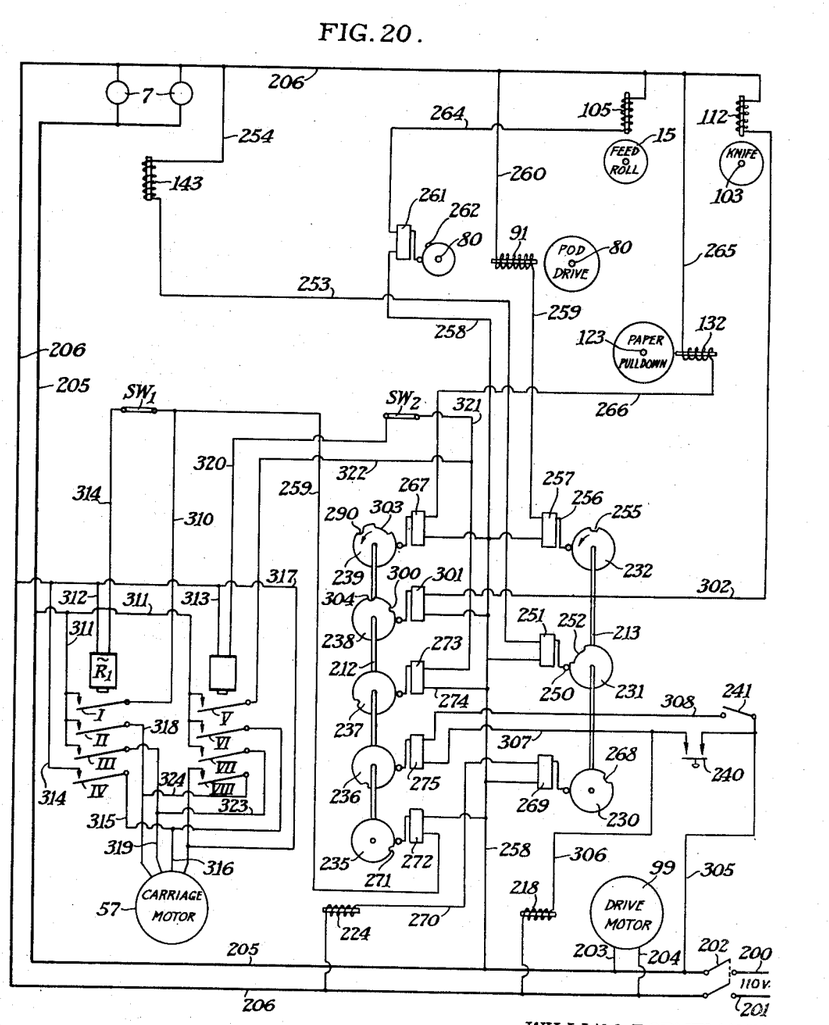
Fig. 20 is a schematic wiring diagram showing the general arrangement of the synchronizing and driving mechanisms used in the preferred embodiment of my machine illustrated.

Fig. 20 shows a schematic wiring diagram by which the movements of the various parts are synchronized. The line wires 200 and 201 furnish a source of current and a double pole switch 202 is for connecting the print-making machine to the line wires. When switch 202 is closed, the main drive motor 99 is energized through conductors 203 and 204. In addition, the lamps 7 are connected across conductors 205 and 206 so that these lamps will be on when the switch 202 is closed to illuminate the sheet 135 (Fig. 21) to be copied.

Figure 13:
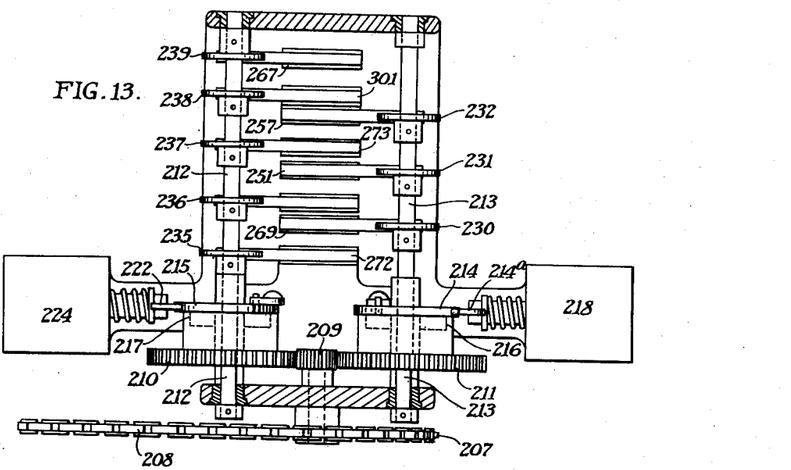
Fig. 13 is a top plan view, partially in section, showing the power-driven control unit including two synchronizing cam shafts which control the operation of the various machine parts in the proper sequence.
Figure 14:
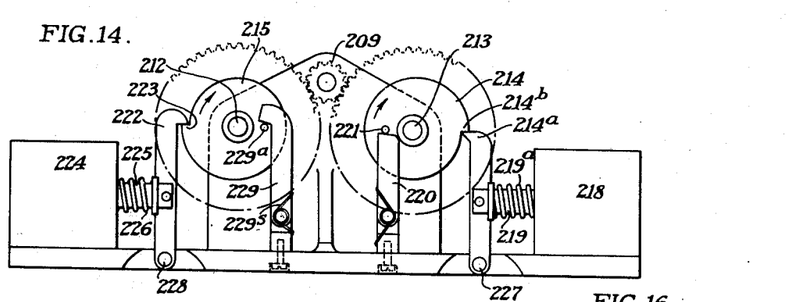
Fig. 14 is an end elevation of the synchronizing mechanism shown in Fig. 13.
Figure 15:
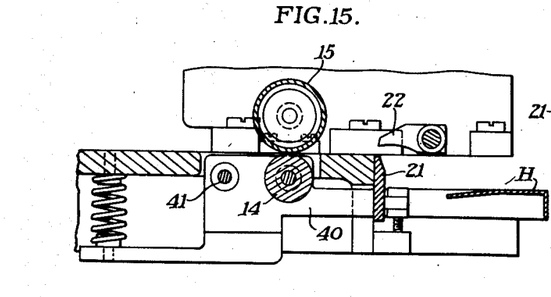
Fig. 15 is a fragmentary detail, partially in section, of the driving rolls and the paper chopper which also illustrates the means for separating the rolls for threading.
Figure 16:
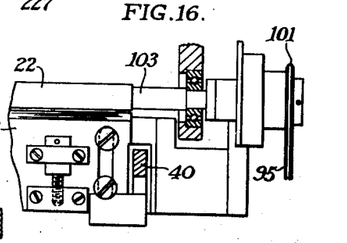
Fig. 16 is a fragmentary end elevation, partially in section, showing the means for driving and adjusting the chopper.

After closing switch 202 to energize the main drive motor 99 and the lamps 7—7, it is necessary to operate the shutter 10 to make an exposure. This is accomplished in the following manner. Referring to Figs. 13 and 14, the main control unit here shown consists of a driving sprocket 207 which is driven by a chain 208 from the motor 99. This drive sprocket drives a pinion 209 meshing with gears 210 and 211, the former turning about a shaft 212 and the latter turning about a shaft 213. There is a one-way slip clutch consisting of a cam disk 214 on one shaft and 215 on the other shaft, each disk having a slip contact with a second plate 216 on one shaft and 217 on the other shaft. These one-revolution clutches are best shown in Fig. 14 where it appears that shaft 212 may be turned only when the cam plate 215 is released by the latch member 222 which engages the latch 223 in this plate. This occurs when a solenoid 224 moves the core 225 against the action of spring 226 to momentarily release this latch. A safety latch member 229 may be pressed by a spring 229s so that the pin 229a may snap past this latch and hold the cam plate 215 against reverse movement. Similarly, shaft 213 may be turned when the cam plate 214 is released by the latch 214a moving out of the path of the latch element 214b, this occurring when the solenoid 218 moves the core 219 against the pressure of a spring 219a. A safety or rebound latch 220 is associated with cam plate 214, a stop pin 221 acting to arrest any reverse movement. The latches 214a and 222 are pivotally mounted at 227 and 228.

The cam shaft 213 has affixed thereto a series of cam disks 230, 231 and 232, each of these being turned one revolution as the shaft 213 turns one revolution. The shaft 212 has a series of cam disks 235, 236, 237, 238, 239. These cam disks have notches or cut-outs in their peripheries, as shown in Fig. 20, and these notches are arranged to operate contact switches during the revolution of their respective shafts.

When the switch 202 is closed, the driving motor tends to turn these two shafts 212—213, but they are held against turning by their clutch latches. In order to start a cycle, the following operation may take place. The operator may press the push button 240 (Fig. 20). This momentarily energizes solenoid 218 through wires 305, 306, thereby releasing the one-turn clutch 214, 216 which drives shaft 213 and cams 230, 231 and 232 so that these cams may turn one revolution. The cam follower 250 on switch 251 drops into the notch 252 of cam 231, closing this switch and energizing solenoid 143 which opens the shutter 10 and holds it open for the required 5 seconds due to the length of the notch 252, and thereby exposing the sensitized material M to the copy material 135. Cam 231 opens switch 251 at the end of an exposure and releases the shutter solenoid so that the shutter 10 can now close under its spring 142. Switch 251 is connected by a wire 253 to one side of the solenoid 143 and thence by a wire 254 to wire 206, and through a common lead 258 to line 205.

Cam 232 includes a notch 255 for operating the spring switch arm 256 of a switch 257. This switch is connected to wire 205 on one side by wire 258 and by a wire 259 to the solenoid 91 which is also connected by a wire 260 to wire 206. Solenoid 91 is energized, thereby releasing the one-turn clutch on the pod-indexing mechanism, enabling the sprockets 76 to turn the chain 75 sufficiently to move the string of pods P the length of one pod unit, by means of the pins 66 and pod apertures 65. This brings a pod into position for the pressure roller. If the pod has become stuck to the sheet of sensitizing material M, this driving mechanism will break this connection and start the pod moving in advance of movement of the strip.

The pod-drive control solenoid 91 moves the pod while the sensitive material M remains stationary to break any adhesions between the used pod and material. An instant after the pod drive starts, say two-tenths of a second, a switch 261 is closed by cam 262 carried by and turning with shaft 80 (Fig. 8), thereby closing the circuit to solenoid 105 through wires 264 and 258. The feed roll 15 is therefore operated only after the pod drive starts. One revolution of the pull-down roll drive shaft 123 winds up the used sensitized material M when one-revolution slip clutch 128 is released by solenoid 105.

A cut-out 268 in cam 230 closes switch 269 momentarily energizing solenoid 224 on the control unit releasing the one-revolution slip clutch 215 which drives shaft 212 of the control unit. Switch 269 is connected to wire 258 and to a wire 270 leading to solenoid 224 and then to wire 206.

A cut-out 271 in cam 235 closes switch 272. This switch is connected, through wires 258, 259, through a normally-closed switch SW₁ and wire 314 to a relay R₁ and then 312 to 206 which, when thus momentarily energized, closes simultaneously a set of normally-open contacts I, II, III, IV. Through contact I and wires 310, 314, 312, a "holding" circuit is closed which maintains R₁ energized after switch 272 is again opened by cam 235. However, it should be noted that switch SW₁ is in this holding circuit, and that if opened, relay R₁ will be de-energized. This occurs when the carriage 42 has moved a required distance toward the exposure area, when it strikes and opens SW₁.

As long as SW₁ is closed, motor 57 (a reversible, single-phase type) will be rotated in the direction required to traverse the carriage as above noted, the operating circuit being from main 206 through wires 314, contact IV, wires 315, 316, motor 57, wire 318, contact II, wire 311 to main 205, and also from 206 through wire 317, motor 57, wire 319, contact III, to 205.

The carriage 42 will return toward the cut-off end of the table when the cut-out in cam 237 closes switch 273, thus establishing a circuit to energize relay R₂. This circuit includes wire 317 from 206, wire 313, relay R₂, wire 320, SW₂, and wire 321 to 273. A "holding" circuit, wire 322, contact V, wire 311, retains R₂ energized, and the circuit through the motor 57 then rotates it in a direction to return the carriage toward the knife as aforesaid. This circuit extends from 206 through wires 317, motor 57, 316, contact VI, 311, to 205, and also 317, contact VIII, 324, motor 323, contact VII, 311 to 205. When the carriage reaches the ends of its travel, it opens SW₂ and R₂ is de-energized, stopping the motor. As relays R₁ and R₂ are never energized during the same period, because of the spacing of the cut-outs in cams 235 and 237, no shorts or inteferring circuit will be set up.

A cut-out 290 in cam 239 momentarily makes a circuit through switch 267, wires 258, 265 and 266 to energize the paper pull-down solenoid 132 for releasing one-revolution slip clutch 104. One turn of measuring roll 15 reels off the waste material.

A cut-out 304 in cam 238 closes switch 301 making a circuit through wires 258 and 302 to energize solenoid 112 releasing one-revolution slip clutch 116 driving knife 22 over knife 21 to cut off the waste material.

Another cut-out 303 in cam 239 closes snap switch 267, again energizing solenoid 132 through wires 266, 265 and 258 and keeping solenoid 132 energized for three revolutions of the one-turn shaft 102 driving the measuring or feed roll 15 three turns to wind off the picture-bearing area of the receiving sheet R. Another cut-out 300 in cam 238 will again energize solenoid 112 of the chopper knife 22 mechanism whereby the knife will cut off the picture on the receiving sheet, preferably depositing it in a suitable receptacle.

A switch 275 is provided whereby a circuit may be held operative around the push-button 240 whenever it is desired to make prints from different originals and start the exposure for print #2 before print #1 has emerged, completed, from the cut-off knife 22. To this end, a switch 241 is interposed between wires 305, 306 and wires 307, 308 to switch 275. When the cut-out in cam 236 closes switch 275, a circuit is established shunting around the push-button and again operating solenoid 218 to start shaft 213 on another cycle, before shaft 212 completes its one revolution.

Figure 22:
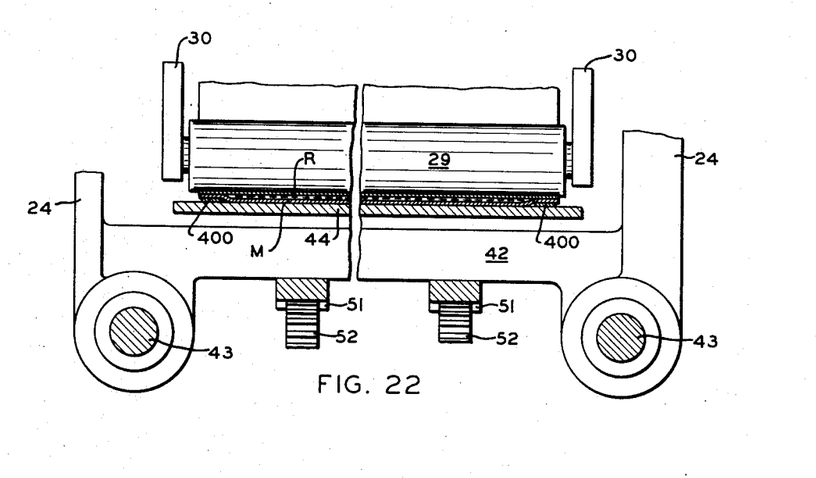
Fig. 22 is an enlarged fragmentary sectional detail similar to Fig. 5 and showing a modification of the support for the sensitized material and the receiving sheet whereby a better control of the thickness of the spread liquid and of its distribution may be had.
Figure 23:
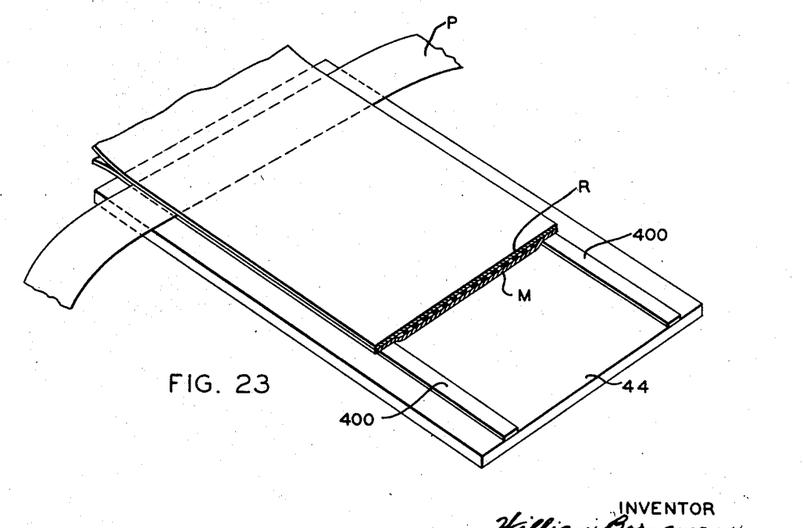
Fig. 23 is a schematic perspective view illustrating the operation of the modified support of Fig. 22.

Under certain circumstances it may be desirable to more carefully control the uniformity and thickness of the liquid layer that is obtained when the contents of the pod P are spread by the foregoing mechanism between the sensitized material M and the receiving sheet R and a modification of the structure of support 44, for obtaining an improved control of the liquid spread, is shown by way of example in Figs. 22 and 23, the thicknesses of the sheet materials M and R being exaggerated for purposes of clarity. In the form shown, support 44 is provided on the sheet-engaging surface thereof with a pair of strips 400 which extend in a direction parallel to the direction of movement of the sensitized material M and which are so located and spaced with respect to one another as to engage the marginal portions of the sensitized material M when the latter is positioned for processing. Strips 400 are preferably formed of a yieldable rubberlike material, such as a natural or synthetic rubber, and are of a depth approximately equal to the thickness to which it is desired to spread the contents of the pod between the sheets M and R. In the event that the surface of support 44 is planar, the strips 400 may be formed of a more rigid material, such as a metal.

During the spreading of the contents of the pod P between the sensitized sheet M and the receiving sheet R, the spacer strips 400 cooperate with the sheets to predetermine the thickness of the spread and to form edge seals which confine the spread between the inner edges of the strips.

What is claimed is:

1. Apparatus for separately applying a liquid-processing agent to a plurality of longitudinally spaced portions of a sheet of light-sensitive material, said apparatus comprising, in combination, stress-applying means comprising a pair of pressure-applying members, means for advancing said sheet of light-sensitive material lengthwise between said pressure-applying members to locate successive areas of said sheet in position for the application of the liquid processing agent thereto, means for mounting a strip comprising a plurality of interconnected rupturable containers, each of said containers carrying said liquid processing agent, and means for moving said strip from said strip-mounting means across the path of movement of said light-sensitive sheet to successively superpose different containers of said strip adjacent different areas of said light-sensitive material, said stress applying means being successively operative at the point of intersection of said container strip and said sheet to apply a compressive force to successively superposed containers and portions of said sheet so as to successively release the contents of said containers for spreading over the adjacent areas of said sheet.

2. Apparatus for separately applying a liquid processing agent to a plurality of longitudinally spaced portions of a sheet of light-sensitive material, said apparatus comprising, in combination, stress-applying means comprising a pair of pressure-applying members, means for advancing said sheet of light-sensitive material lengthwise between said pressure-applying members to locate successive areas of said sheet in position for the application of the liquid processing agent thereto, means for mounting a strip comprising a plurality of interconnected rupturable containers, each of said containers carrying said liquid processing agent, means for moving said strip from said strip-mounting means across the path of movement of said light-sensitive sheet to successively superpose different containers of said strip adjacent different areas of said light-sensitive material, said stress applying means being successively operative at the point of intersection of said container strip and said sheet to apply a compressive force to successively superposed containers and portions of said sheet so as to successively release the contents of said containers for spreading over the adjacent areas of said sheet, and means for advancing a second sheet of material lengthwise between said pressure-applying members and for so superposing portions of said second sheet on said light-sensitive sheet that the contents of each of said containers of said strip when released by the action of said pressure-applying members are spread between the two sheets.

3. Apparatus for separately applying a liquid processing agent to a plurality of longitudinally spaced portions of a sheet of light-sensitive material, said apparatus comprising, in combination, stress-applying means comprising a pair of pressure-applying members, means for mounting said sheet of light-sensitive material, means for drawing said sheet lengthwise from said mounting means and for advancing said sheet between said pressure-applying members to locate successive areas of said sheet in position for the application of the liquid processing agent thereto, means for mounting a strip comprising a plurality of ribbon-like rupturable containers, connected end-to-end, each of said containers carrying said liquid processing agent, means for moving said strip from said strip-mounting means in a direction generally parallel to the long dimension of said strip and transverse to the path of movement of said sheet to successively superpose different containers of said strip adjacent different areas of said light-sensitive material, said stress-applying means being successively operative at the point of intersection of said container strip and said sheet to apply a compressive force to successively superposed containers and portions of said sheet so as to successively release the contents of said containers for spreading over the adjacent areas of said sheet, and means for receiving and storing the emptied containers of said strip without detaching the same from said strip.

4. Apparatus for separately applying a liquid processing agent to a plurality of longitudinally spaced portions of a sheet of light-sensitive material, said apparatus comprising, in combination, stress-applying means comprising a pair of pressure-applying members, means for mounting said sheet of light-sensitive material, means for drawing said sheet lengthwise from said mounting means and for advancing said sheet between said pressure-applying members to locate successive areas of said sheet in position for the application of the liquid processing agent thereto, means for mounting a strip comprising a plurality of ribbon-like rupturable containers, connected end-to-end, each of said containers carrying said liquid processing agent, means for moving said strip from said strip-mounting means in a direction generally parallel to the long dimension of said strip and transverse to the path of movement of said sheet to successively superpose different containers of said strip adjacent different areas of said light-sensitive material, said stress-applying means being successively operative at the point of intersection of said container strip and said sheet to apply a compressive force to successively superposed containers and portions of said sheet so as to successively release the contents of said containers for spreading over the adjacent areas of said sheet, means for advancing a second sheet of material lengthwise between said pressure-applying members and for so superposing portions of said second sheet on said light-sensitive sheet that the contents of each of said containers of said strip when released by the action of said pressure-applying members are spread between the two sheets, and means for receiving and storing the emptied containers of said strip without detaching the same from said strip.

5. The apparatus of claim 4 wherein the means for advancing the second sheet and the means for moving the container strip impart intermittent motion to each of said materials and wherein means are provided for synchronizing the operation of said means for imparting movement.

6. The apparatus of claim 4 wherein the container strip is provided with perforations and the moving means for said strip is adapted to engage said perforations in order to impart movement to said strip.

7. Apparatus for separately applying a liquid processing agent to a plurality of longitudinally spaced portions of a sheet of light-sensitive material, said apparatus comprising, in combination, stress-applying means comprising a pair of pressure-applying members, one of said members being a supporting plate, means for advancing a sheet of said light-sensitive material lengthwise between said pressure-applying members to locate successive areas of said sheet on said supporting plate in position for the application of the liquid processing agent thereto, means for mounting a plurality of rupturable containers, each of said containers carrying said liquid processing agent, means for feeding said containers from said mounting means so as to successively superpose different containers of said strip adjacent different areas of said light-sensitive material, said stress-applying means being successively operative at the point of intersection of said container strip and said sheet to apply a compressive force to successively superposed containers and portions of said sheet so as to successively release the contents of said containers for spreading over the adjacent areas of said sheet, means for advancing a second sheet of material lengthwise between said pressure-applying members and for so superposing portions of said second sheet on said light-sensitive sheet that the contents of each of said containers, when released by the action of said pressure-applying members, are spread between the two sheets, and a pair of spacer strips substantially parallel to one another mounted on said supporting plate to extend substantially parallel to the long edges of the portion of said light-sensitive sheet supported by said plate, said spacer strips being so spaced apart as to engage the marginal portions of said light-sensitive sheet during the spreading of the contents of said containers between said sheets to control the thickness of the spread.

8. The apparatus of claim 7 wherein the spacer strips are formed of a yieldable material.

9. The apparatus of claim 2 wherein one of said pressure-applying members is a supporting plate upon which each area of the light-sensitive sheet to be processed is positioned during the application of the processing agent thereto and wherein a pair of spacer strips, substantially parallel to one another, are mounted on said supporting plate to extend substantially parallel to the long edges of said area of said light-sensitive sheet supported by said plate, said spacer strips being so spaced apart as to engage the marginal portions of said light-sensitive sheet during the spreading of the contents of each of said containers between said sheets to control the thickness and the width of the spread.

10. A process of treating a plurality of longitudinally spaced portions of a sheet of light-sensitive material with a liquid processing agent which comprises the steps of advancing said sheet lengthwise to successively locate each of said portions in processing position; advancing a strip comprising a plurality of containers, each carrying the liquid processing agent, transversely across the path of movement of said light-sensitive material to position a container of said strip adjacent one edge of the portion of said sheet in processing position; holding the light-sensitive sheet and said container stationary relative to one another and dispensing the contents of the container over the adjacent portion of said light-sensitive sheet; and thereafter advancing the container strip and the light-sensitive sheet across one another to locate another container of said strip in position for releasing its contents over another portion of said light-sensitive sheet.

11. A process of treating a plurality of longitudinally spaced portions of a sheet of light-sensitive material by applying thereto a layerwise distribution of liquid processing agent which comprises the steps of advancing said light-sensitive sheet lengthwise to successively locate each of said portions in processing position; advancing a strip comprising a plurality of rupturable containers, connected end to end and carrying said processing agent, transversely across the path of movement of said light-sensitive sheet to position at least one container in said strip adjacent one edge of the portion of said sheet in processing condition; holding said container stationary relative to said sheet and, while so holding said container, dispensing the contents thereof between said light-sensitive sheet and a second sheet of material superposed thereon to spread the container contents in a layer between the two sheets; and thereafter advancing the container strip and the light-sensitive sheet across one another and advancing the other sheet material parallel to the light-sensitive sheet to locate another container of said strip in position for releasing its contents over another portion of said light-sensitive sheet and to locate said other sheet material in position for having another portion thereof superposed on said light-sensitive sheet.

12. A process of treating a plurality of exposed longitudinally spaced areas of a sheet comprising a silver halide emulsion by applying thereto a layerwise distribution of a liquid processing agent which comprises the steps of advancing said silver halide sheet lengthwise to successively locate each of said exposed areas in processing position; advancing a strip comprising a plurality of rupturable containers, connected end to end and carrying said liquid processing agent, transversely across the path of movement of said silver halide sheet to position at least one container of said strip adjacent one edge of the area of said sheet in processing position; holding said container stationary relative to said sheet and, while so holding said container, dispensing the contents thereof between said silver halide sheet and a second sheet of material superposed thereon to spread the container contents in a layer between the two sheets; and thereafter advancing the container strip and the silver halide sheet across one another and advancing the other sheet parallel to the other silver halide sheet to locate another container of said strip in position for releasing its contents over another exposed area of said silver halide sheet and to locate said other sheet material in position for having another portion thereof superposed on said silver halide sheet.

13. The process of claim 11 wherein the strip of containers, in filled condition, is held in accordion fashion adjacent to the path of movement of said light-sensitive sheet material.

14. The process of claim 13 wherein the strip is wound in a roll after the contents of the containers thereof have been released.

WILLIAM BORNEMANN.

References Cited in the file of this patent

UNITED STATES PATENTS

| Number | Name | Date |
|---|---|---|
| 1,057,712 | Crompton | Apr. 1, 1913 |
| 1,841,653 | Grinten et al. | Jan. 19, 1932 |
| 1,907,252 | Debrie | May 2, 1933 |
| 2,397,763 | Streich | Apr. 2, 1946 |
| 2,431,041 | Hassler | Nov. 18, 1947 |
| 2,477,304 | Land | July 26, 1949 |